United States Patent [19]

Slade

[11] 4,352,971

[45] Oct. 5, 1982

[54] SELF-EQUALIZING WELDING STRUCTURE

[76] Inventor: Clyde G. Slade, 2147 E. Ten Mile Rd., Warren, Mich. 48091

[21] Appl. No.: 193,910

[22] Filed: Oct. 6, 1980

[51] Int. Cl.³ .................................................. B23K 9/12
[52] U.S. Cl. ..................................... 219/86.61; 219/89
[58] Field of Search ............................... 219/86.61, 89

[56] References Cited

U.S. PATENT DOCUMENTS

| | | | |
|---|---|---|---|
| 2,372,413 | 3/1945 | Weightman | 219/89 |
| 2,952,765 | 9/1960 | Droste | 219/89 |
| 3,136,879 | 6/1964 | Waltonen | 219/89 |

*Primary Examiner*—Elliot A. Goldberg
*Attorney, Agent, or Firm*—Whittemore, Hulbert & Belknap

[57] ABSTRACT

Self-equalizing welding structure and method. The structure comprises piston and cylinder structure held in a fixed support, including cylinder ends movable into and out of the opposite ends thereof, a welding electrode attached to one rod cylinder end on one side of a workpiece, a travel rod extending through the support and connected to the other cylinder end, means for securing a second electrode to the travel rod on the other side of the workpiece, and self-equalizing pressure means for extending the cylinder ends from the piston and cylinder structure and for withdrawing them into the piston and cylinder structure. The method of operation comprises applying an actuating medium to the piston and cylinder structure through a single inlet to first cause the one cylinder end to advance the one electrode connected to it into engagement with a workpiece and to then cause the other cylinder end to extend from the piston and cylinder structure to move the travel rod and other electrode into engagement with the other side of the workpiece and to then apply equal pressure to the electrodes on both sides of the workpiece.

4 Claims, 9 Drawing Figures

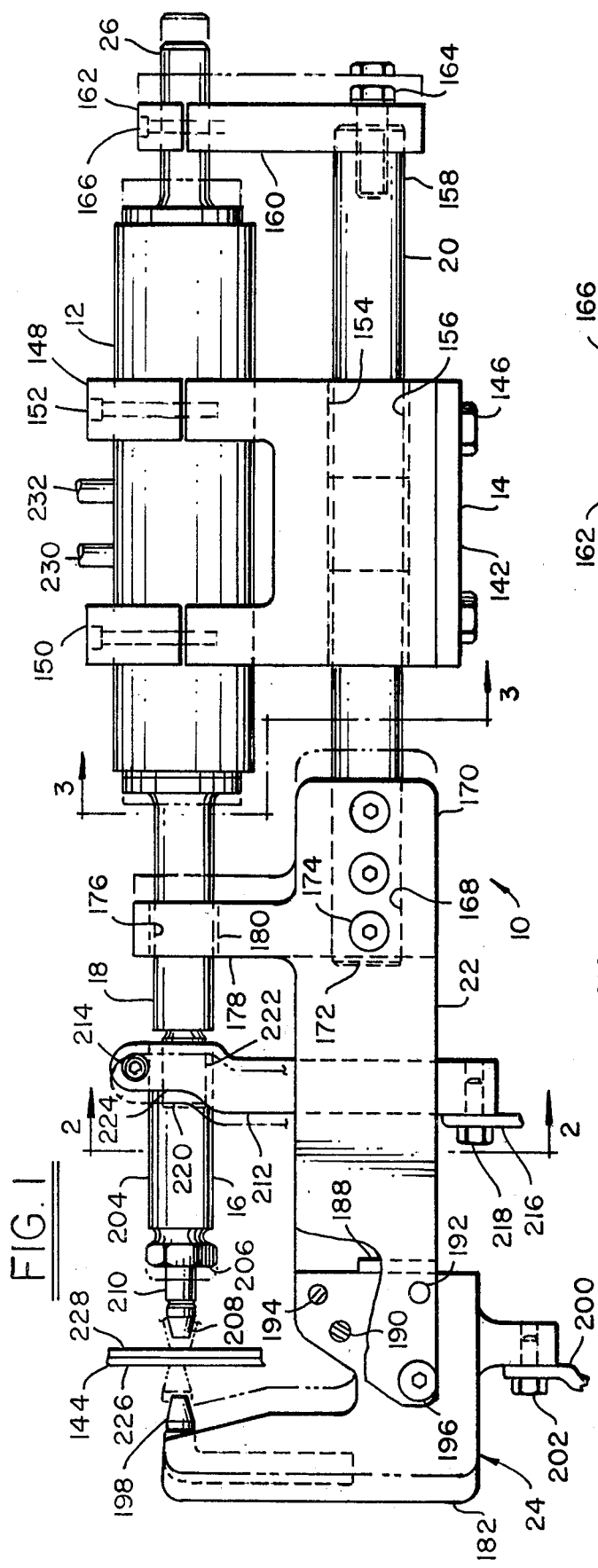
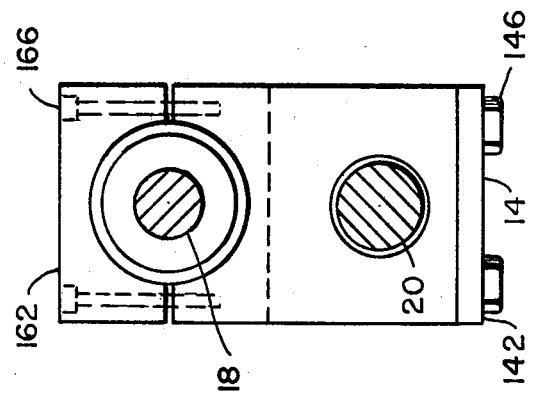
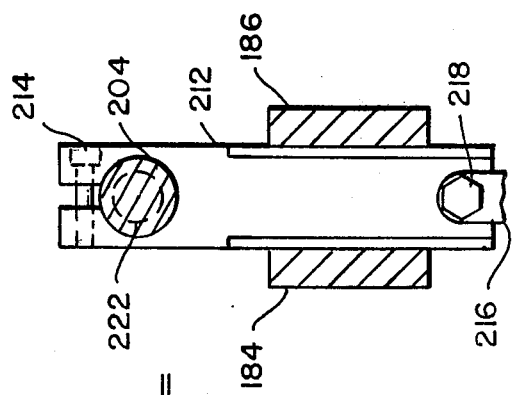

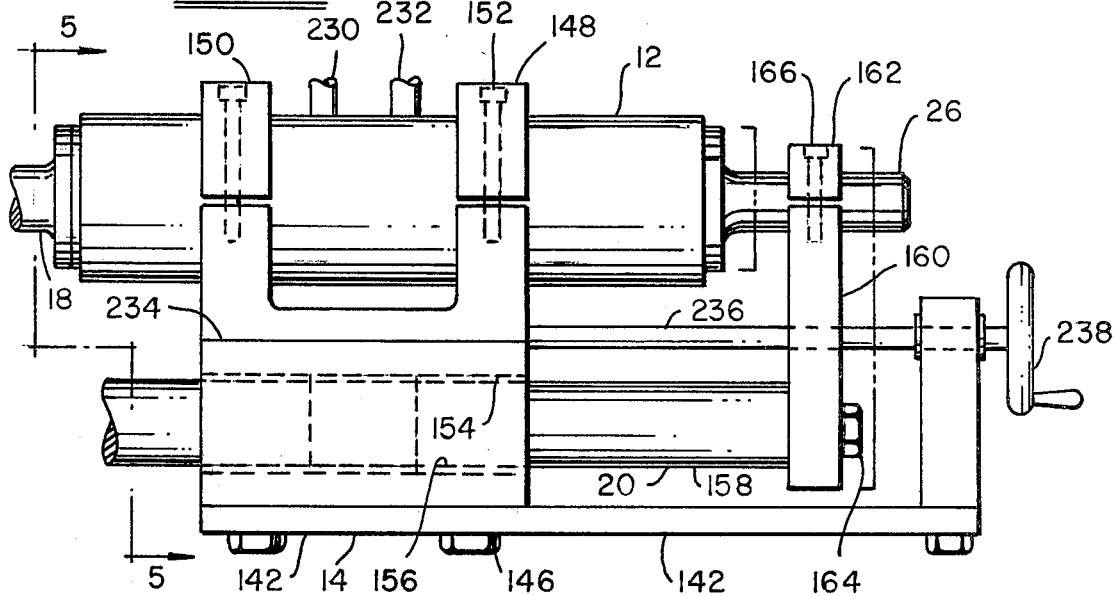
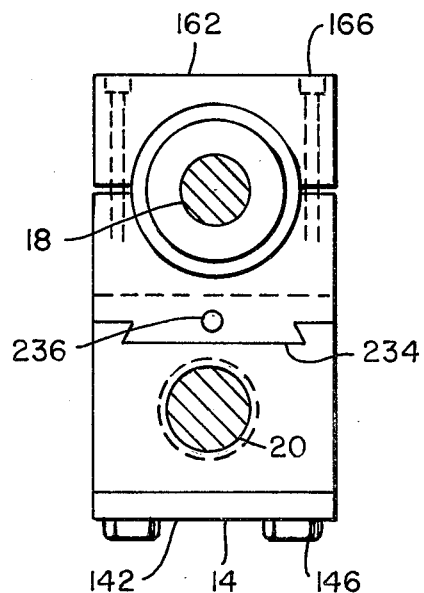

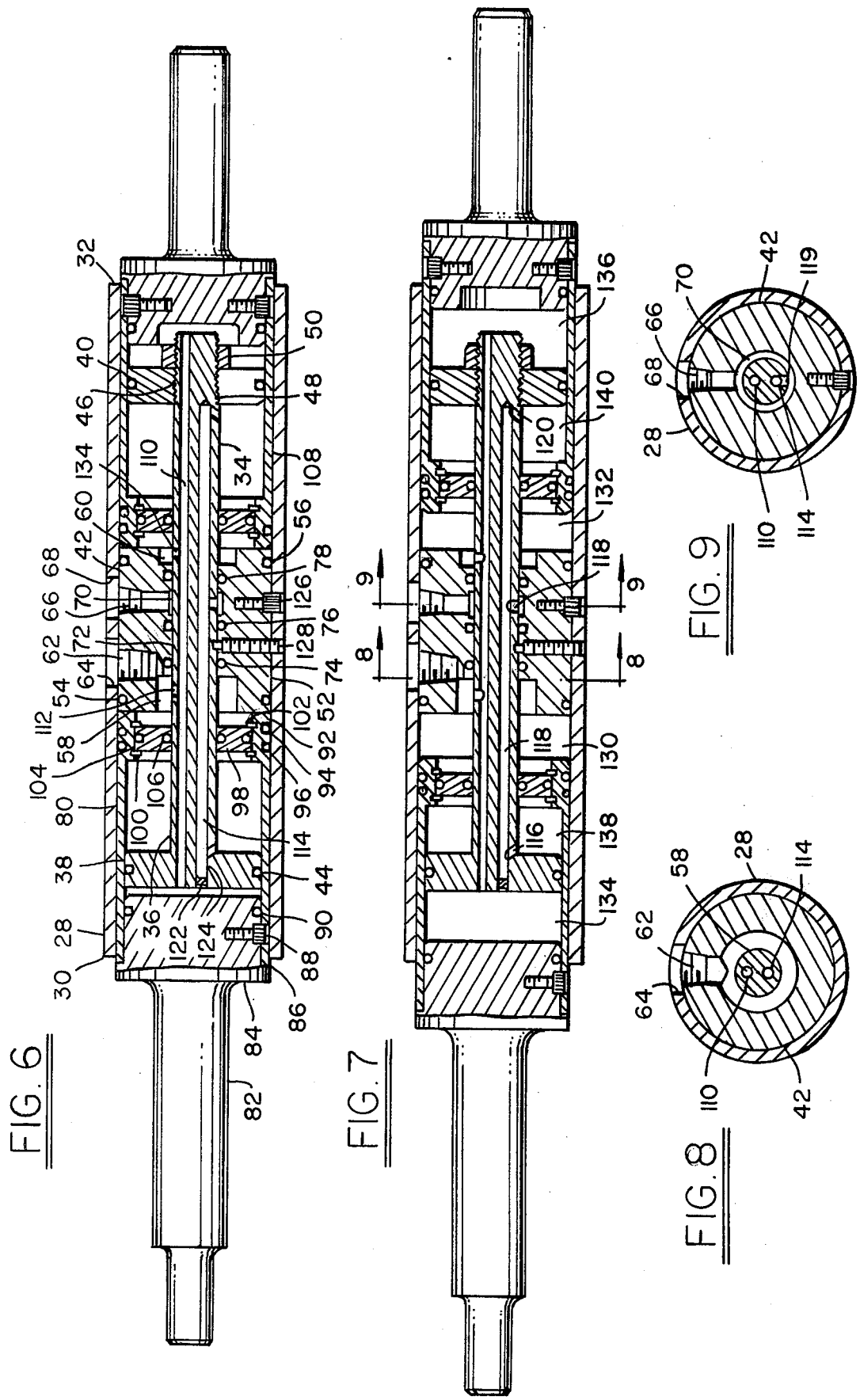

SELF-EQUALIZING WELDING STRUCTURE

BACKGROUND OF THE INVENTION

1. Field of the Invention

The invention relates to welding guns and refers more specifically to self-equalizing welding guns wherein equal pressure is applied on electrodes on opposite sides of a workpiece by means of a single welding gun, and refers more specifically to double-acting piston and cylinder structure in a self-equalizing welding gun positively actuated to sequentially move two electrodes into engagement with a workpiece on opposite sides thereof under substantially equal pressure and to subsequently increase the pressure equally on both electrodes to welding pressure with only a single actuating medium pressure and exhaust connection and without return springs, which structure and method is particularly simple, economical and efficient.

2. Description of the Prior Art

In the past, self-equalizing welding guns of the type wherein substantially equal pressure is applied to electrodes engaged with a workpiece on opposite sides thereof for welding purposes have been known. However, the prior self-equalizing welding guns often required spring return means to place the electrodes in their initial position after welding, or have required a plurality of pressure medium connections to exhaust piston and cylinder structure. Return springs and multiple pressure medium lines are often complicated, expensive and inefficient.

SUMMARY OF THE INVENTION

In accordance with the invention, a dual double-acting piston and cylinder structure is utilized with a single actuating medium input and exhaust conduit without the use of return springs to first engage one electrode secured to one end thereof with one side of a workpiece, to subsequently engage a second electrode connected to the other end of the piston and cylinder structure with the other side of a workpiece, and to subsequently apply equalized pressure on both sides of the workpiece through the electrodes up to welding pressure. In accordance with the invention, after welding is accomplished, the electrodes are positively returned to their starting position.

BRIEF DESCRIPTION OF THE DRAWINGS

FIG. 1 is an elevation view of a self-equalizing welding gun constructed in accordance with the invention for effecting the method of the invention.

FIG. 2 is a cross section of the welding gun illustrated in FIG. 1, taken substantially on the line 2—2 in FIG. 1.

FIG. 3 is a cross section of the welding gun illustrated in FIG. 1, taken substantially on the line 3—3 in FIG. 1.

FIG. 4 is a partial elevation view of a modification of the self-equalizing welding gun illustrated in FIG. 1, showing an adjustable fixed support whereby the piston and cylinder structure carried thereby may be adjusted longitudinally.

FIG. 5 is a cross section of the welding gun illustrated in FIG. 1, taken substantially on the line 5—5 in FIG. 4.

FIG. 6 is a longitudinal section of the dual double-acting piston and cylinder structure of the self-equalizing welding gun of FIGS. 1–3.

FIG. 7 is another longitudinal section of the piston and cylinder structure substantially as illustrated in FIG. 5, but showing the inner cylinders extended.

FIG. 8 is a transverse cross section of the piston and cylinder structure illustrated in FIGS. 1–3, taken substantially on the line 7—7 in FIG. 6.

FIG. 9 is a transverse cross section of the piston and cylinder structure illustrated in FIGS. 1–3, taken substantially on the line 8—8 in FIG. 6.

DESCRIPTION OF THE PREFERRED EMBODIMENT

As shown best in FIG. 1, the self-equalizing welding gun 10 includes the dual double action piston and cylinder structure 12 secured to the fixed support 14. Electrode means 16 is secured to cylinder end 18 of the piston and cylinder structure 12. A travel rod 20 and electrode adapter yoke 22 connect the electrode means 24 to the other cylinder end 26 of the piston and cylinder structure 12.

More specifically, as shown best in FIGS. 5–8, the piston and cylinder structure 12 comprises an outer hollow cylinder 28 open at both ends 30 and 32. Piston means 34 including piston rod 36 and pistons 38 and 40 are secured within the outer cylinder 28 centrally thereof by the securing means 42.

As shown, the piston 38 is integral with the piston rod 36 and is sealed about its outer periphery by the annular ring seal 44. The piston 40 is positioned over the end 46 of the piston rod 36 and is secured thereon by the abutment 48 and the nut 50.

Piston securing means 42 includes the annular cylindrical member 52 which is sealed at each end by the annular seals 54 and 56 and which has recesses 58 and 60 in the opposite ends thereof.

The piston securing means 42 further includes an opening 62 therein aligned with an opening 64 in the outer cylindrical member 28 in communication with the recess 58, through which actuating medium is caused to enter and exhaust from the piston and cylinder structure 12.

The piston securing means 42 has a second radially extending opening 66 therein aligned with a second radial opening 68 in the outer cylinder 28 in communication with an annular internal groove 70 therein through which actuating medium is placed into the piston and cylinder structure 28 to retract the inner cylinders thereof.

The piston rod 36 extends through passage 72 in the annular cylindrical member 52. The passage 72 is provided with annular seals 74, 76 and 78 spaced axially therealong, as shown.

The piston and cylinder structure 12 further includes the inner cylinder 80 within the end 30 of the outer cylinder 28. The inner cylinder 80 includes the cylinder end 82 whch includes a cap portion 84 which closes the end 86 thereof. The cylinder end 82 is connected to the end 86 of the cylinder 80 by convenient means such as the bolt 88. The end 84 of the cylinder end 82 is sealed by the annular seal 90, as shown. The other end 92 of the inner cylinder 80 is sealed exteriorly by the sealing means 94 and the piston ring 96.

An annular piston-like member 98 is positioned in the end 92 of the inner cylinder member 80 and is held in place by the locking rings 100 and 102. The member 98 is sealed about its exterior periphery by the annular seal 104 and its inner periphery by the annular seal 106.

The inner cylinder 108 within the other end 32 of the outer cylinder 28 is exactly the same as the inner cylinder 80.

The piston rod 36 is provided with means for passing actuating medium into and out of the dual double-acting piston and cylinder structure 12 to produce extension of the inner cylinders 80 and 108 or retraction thereof selectively. Thus, an axial passage 110 is provided in the piston rod 36 in communication with a radially extending opening 112. A second axial passage 114 is further provided in the piston rod 36 and is in communication with the radially extending passages 116, 118 and 120. Passage 114 is closed by plug 122 at the end 124 thereof.

A bolt 126 secures the cylindrical member 42 in position in the outer cylinder 30. Similarly, the set screw 128 secures the piston rod 36 in position within the cylindrical member 42. Thus, neither the cylinder 42 nor the piston rod 36 is permitted to rotate or move axially relative to the outer cylinder 30.

In overall operation of the dual double-acting piston and cylinder structure 12, with a single actuating fluid medium line connected to radially extending recess 62 in the piston securing means 42 through the opening 64 in the outer cylinder 28, and with a single actuating fluid medium line connected to the radially extending recess 66 through the opening 68, when it is desired to extend the inner cylinders 80 and 108 out of the ends 30 and 32 of the outer cylinder 28, actuating fluid under pressure is applied through recess 62 so that it flows into recess 58 in the piston securing structure 42. The actuating medium thus passes into chamber 130.

The same actuating fluid under pressure will proceed through passage 110 in the piston rod 36 and into recess 60 and subsequently into chamber 132 on the opposite side of the piston retaining means 42 through radial passage 134 in the piston rod 36. The actuating medium in the passage 110 will further flow into the chambers 134 and 136. There will thus be a double pressure exerted on both of the inner cylinders 80 and 108 tending to extend the inner cylinders 80 and 108 out of the outer cylinder 28.

At this time, any actuating medium in the chambers 138 and 140 between the pistons 38 and 40 and the structure closing the inner ends of the inner cylinders 80 and 108 will be forced through radial passages 114 and 120 in the piston rod 36, through the passage 118 extending axially of the piston rod and out of the piston rod through the radially extending passage 119 into the annular groove 70 and out through the radial passage 66 and opening 68 in the piston securing means 42 and outer cylinder 28.

When it is desired to retract the inner cylinders 80 and 108, the actuating medium is fed to the piston and cylinder structure 12 through the radially extending passage 66 and opening 68 to increase the pressure in the chambers 138 and 140. At this time, during retraction of the inner cylinders 80 and 108, the actuating medium in the chambers 130, 132, 134 and 136 is exhausted through the radial passage 62 and the opening 64.

As will be seen from consideration of the operation of the dual double-acting piston and cylinder structure 12, the pressure tending to extend or retract the inner cylinder structures 80 and 108 will be substantially the same. That is, the pressure will tend to equalize at both ends of the piston and cylinder structure 12.

The support structure 14 shown best in FIGS. 1–3 includes a base 142 adapted to be held in a fixed position relative to workpiece 144 by convenient means such as bolts 146. The base 142 includes a clamping portion 148. The piston and cylinder structure 12 is secured to the base 142 by the clamping portion 148 in conjunction with the bolts 152.

Base 142 further has an opening 154 therein having bushings 156 in the opposite ends thereof for receiving the travel rod 20 therein. The travel rod 20 is thus mounted for axial reciprocation in the base 142 parallel to the axis of the piston and cylinder structure 12.

The travel rod 20 is secured at end 158 to the cylinder end 26 attached to the inner cylinder 108 of the piston and cylinder structure 12 by the connecting member 160 and clamp 162 in conjunction with the bolts 164 and 166. The travel rod 20 thus reciprocates axially on extension and retraction of the inner cylinder 108 of the piston and cylinder structure 12.

The electrode adapter yoke 22 is provided with an opening 168 in end 170 thereof to which the other end 172 of the travel rod 20 is secured by convenient means such as the set screws 174.

A further opening 176 is provided through the extension 178 of the yoke 22 through which the cylinder end 18 extends in bushing 180. The yoke 22 is thus guided in reciprocal movement axially of the piston and cylinder structure 12 on the cylinder end 18.

The electrode means 24 includes the electrode holder 182 secured between the parallel spaced apart leg portions 184 and 186 of the yoke 22 in engagement with the stop 188 extending between the legs 184 and 186 by the dowel pins 190 and 192 and the bolts 194 and 196.

A welding electrode 198 is secured to the electrode holder 182 by convenient means such as bolts, not shown. Welding energy may be connected to the electrode holder 182 and thus to welding electrode 198 through the electrical conductor 200 secured to the electrode holder 182 by convenient means such as the bolt 202.

The electrode means 16 includes the electrode holder 204, electrical adapter 206 and the electrode cap and electrode adapter 208 and 210, respectively. Electrode means 16 further includes the yoke 212 secured to the electrode holder 204 by bolt 214. Welding electrical energy is thus passed to the electrode 208 through the electrode adapter 210, electrical adapter 206, holder 204 and yoke 212 from an electrical cable 216 secured to the yoke 212 by convenient means such as bolt 218.

Electrical energy from the electrical conductor 216 is isolated from the rest of the self-equalized welding gun 10 by an insulating disc 220 and insulating pad 222 surrounding the end 224 of the cylinder end 18.

In overall operating of the self-equalizing welding gun 10, a workpiece 144 consisting of two members 226 and 228, which it is desired to weld together, is passed between the electrodes 198 and 208 in a direction perpendicular to the drawing of FIG. 1. With the workpiece 144 in the desired position, an actuating medium such as air under pressure is fed into the piston and cylinder structure 12, through conductor 230 into the radial passage 62, as shown in FIGS. 5 and 6, to cause the inner cylinder 80 and thus welding electrode 208 to move to the left in FIG. 1, into the phantom position in contact with the member 228 of the workpiece 144.

The inner cylinder 80 initially moves on application of actuating medium to the piston and cylinder structure 12 since there is initially less resistance to movement of the inner cylinder 80 than there is to inner cylinder 108, due to the additional structure secured to the inner cyliner 108 between the inner cylinder 108 and the electrode 198.

However, when the electrode 208 engages the part 228 of the workpiece 144, the added resistance of the workpiece 144 causes the movement of the inner cylinder 80 toward the workpiece 144 to stop and permits the pressure in the piston and cylinder structure 12 to build up sufficiently to overcome the slight resistance to movement in the cylinder 108. Cylinder 108 is then extended from the piston and cylinder structure 12 while the pressure on the workpiece 144 from electrode 208 is still relatively light.

On extension of the inner cylinder 108 out of the piston and cylinder structure 12, the travel rod 20 is caused to move to the right in FIG. 1, taking with it the yoke structure 22 and the electrode means 24. The electrode 198 is thus moved into contact with the part 226 of the workpiece 144 immediately opposite the electrode 208.

The pressure exerted by the piston and cylinder structure 12 on the workpiece 144 through the electrodes 208 and 198 then increases to the welding pressure as determined by the pressure from the fluid medium source through the conduit 230 and the construction of the piston and cylinder structure 12. Welding current is then provided through the electrical conductors 200 and 216 to produce the desired weld of the workpiece 144.

Actuating medium pressure in line 230 is then removed and actuating medium pressure is provided in the piston and cylinder structure 12 through the actuating medium line 232. The inner cylinders 80, 108 of the piston and cylinder structure 12 are thus retracted as previously indicated to return the welding electrodes to the solid line position as shown in FIG. 1.

In the above indicated operation, it will be noted that the open position of electrodes 198 and 208 is determined by the inner limiting position of the inner cylinders 80 and 108, while the closed positions of the electrode caps 198 and 208 are determined by the actual position of the workpiece 144.

Further, the closed position of the electrode caps 198 and 208 need not necessarily be the same in successive welding operations, since electrode 208 will engage the workpiece member 228 first at whatever location it is in and the electrode 198 will then engage the workpiece member 226, again at whatever location it is in.

Further, it will be noted that in the structure and method of operation of the self-equalizing welding gun 10 of the invention, that during any pressure buildup, the pressure on the opposite sides of the electrodes 208 and 198 remain entirely equalized.

Also, it will be noted that with the structure of the invention, there are no return springs or the like to become broken or fatigued or to otherwise make the operation of the self-equalizing welding gun 10 of the invention less efficient and that only two actuating medium lines are required for the operating of the welding gun.

In the modification of the self-equalizing welding gun of the invention illustrated in FIG. 4, the support base 124 is split horizontally and provided with a dovetail slot 234 and screw and nut actuating mechanism 236 operable therebetween by means of the hand wheel 238 or the like. The actuating mechanism together with the dovetail slot arrangement 234 is effective to permit axial positioning of the piston and cylinder structure 12 as required to initially change the location of the welding electrodes 198 and 208.

While one embodiment of the present invention has been considered in detail, together with a modification thereof, it will be understood that other embodiments and modifications thereof are contemplated. It is the intention to include all such embodiments and modifications as are suggested by the foregoing disclosure within the scope of the invention as defined by the appended claims.

I claim:

1. A self-equalizing welding gun comprising a fixed base, a piston and cylinder structure having two ends and a longitudinally extending axis of generation secured to the fixed base, first and second cylinder means each having an end positioned for sliding telescopic movement axially of the piston and cylinder structure in each of the two ends of the piston and cylinder structure, means for selectively moving the cylinder means ends into or out of the ends of the piston and cylinder structure under equalized pressure, a welding electrode secured to the first cylinder means at one end of the piston and cylinder structure, a travel rod extending parallel to the piston and cylinder structure through the fixed base, one end of which is connected to the second cylinder means, and means securing a second welding electrode to the other end of the travel rod.

2. Structure as set forth in claim 1, wherein the means for selectively moving the cylinder means ends includes means for first moving the first electrode into engagement with a workpiece on one side of the workpiece under a low pressure, means for subsequently moving the other electrode into engagement with the other side of the workpiece under a low pressure and means for subsequently increasing the pressure on both electrodes to a welding pressure.

3. Structure as set forth in claim 2 wherein the means for moving the electrodes into engagement with the workpiece comprises a single actuating medium input and output connection.

4. Structure as set forth in claim 1 and further including means for adjusting the position of the piston and cylinder structure on the base.

* * * * *

UNITED STATES PATENT AND TRADEMARK OFFICE
CERTIFICATE OF CORRECTION

PATENT NO.   :   4,352,971
DATED        :   October 5, 1982
INVENTOR(S)  :   Clyde G. Slade It is certified that error appears in the above-identified patent and that said Letters Patent is hereby corrected as shown below:

The term of this patent subsequent to Nov. 5, 1995 has been disclaimed.

Signed and Sealed this

Twenty-third Day of July 1985

[SEAL]

Attest:

DONALD J. QUIGG

Attesting Officer

Acting Commissioner of Patents and Trademarks